United States Patent
Allier et al.

(10) Patent No.: US 10,564,602 B2
(45) Date of Patent: Feb. 18, 2020

(54) METHOD FOR OBSERVING A SAMPLE

(71) Applicant: COMMISSARIAT A L'ENERGIE ATOMIQUE ET AUX ENERGIES ALTERNATIVES, Paris (FR)

(72) Inventors: Cedric Allier, Grenoble (FR); Thomas Bordy, Grenoble (FR); Olivier Cioni, Grenoble (FR); Lionel Herve, Corenc (FR); Sophie Morel, Douai (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 12 days.

(21) Appl. No.: 15/577,129

(22) PCT Filed: May 26, 2016

(86) PCT No.: PCT/FR2016/051250
§ 371 (c)(1),
(2) Date: Nov. 27, 2017

(87) PCT Pub. No.: WO2016/189257
PCT Pub. Date: Dec. 1, 2016

(65) Prior Publication Data
US 2018/0210395 A1 Jul. 26, 2018

(30) Foreign Application Priority Data
May 28, 2015 (FR) ...................... 15 54811

(51) Int. Cl.
*G03H 1/08* (2006.01)
*G03H 1/04* (2006.01)
(Continued)

(52) U.S. Cl.
CPC ......... *G03H 1/0866* (2013.01); *G03H 1/0443* (2013.01); *G03H 1/2645* (2013.01);
(Continued)

(58) Field of Classification Search
CPC ... G03H 2001/0454; G03H 2001/0471; G03H 2001/266; G03H 2240/62
See application file for complete search history.

(56) References Cited

U.S. PATENT DOCUMENTS

2015/0268628 A1* 9/2015 Sato ..................... G02B 21/365
356/457

FOREIGN PATENT DOCUMENTS

WO 2015/015023 A1 2/2015
WO WO-2015015023 A1 * 2/2015

OTHER PUBLICATIONS

International Search Report dated Sep. 2, 2016, in PCT/FR2016/051250 filed May 26, 2016.
(Continued)

*Primary Examiner* — Mainul Hasan
(74) *Attorney, Agent, or Firm* — Oblon, McClelland, Maier & Neustadt, L.L.P.

(57) ABSTRACT

A method for observing a sample includes illuminating the sample with a light source and forming a plurality of images, by an imager, the images representing the light transmitted by the sample in different spectral bands. From each image, a complex amplitude representative of the light wave transmitted by the sample is determined in a determined spectral band. The method further includes backpropagation of each complex amplitude in a plane passing through the sample, determining a weighting function from the back-propagated complex amplitudes, propagating the weighting function in a plane along which the matrix photodetector extends, updating each complex amplitude, in the plane of the sample, according to the weighting function propagated.

9 Claims, 9 Drawing Sheets (51) Int. Cl.
    *G03H 1/26*       (2006.01)
    *G03H 1/22*       (2006.01)

(52) U.S. Cl.
    CPC ............... *G03H 2001/0447* (2013.01); *G03H 2001/0454* (2013.01); *G03H 2001/0471* (2013.01); *G03H 2001/0816* (2013.01); *G03H 2001/2263* (2013.01); *G03H 2001/266* (2013.01); *G03H 2210/13* (2013.01); *G03H 2222/13* (2013.01); *G03H 2222/17* (2013.01); *G03H 2222/18* (2013.01); *G03H 2240/62* (2013.01)

(56) References Cited

OTHER PUBLICATIONS

Peng Sao et al., "Optical surface profile measurement using phase retrieval by tuning the illumination wavelength", *Optics Communications*, vol. 285, No. 24, Aug. 23, 2012, pp. 5029-5036, XP0555269908.

Yen Li et al., "Phase retrieval from double axially displaced holograms for dual-wavelength in-line holography", *Chinese Optics Letters*, vol. 12, No. 2, Feb. 10, 2014 (posted online Jan. 27, 2014), 4 pages, XP055269833.

Daniel W. E. Noom et al., "Lensless phase contrast microscopy based on multiwavelength Fresnel diffraction", *Optics Letters*, Optical Society of America, vol. 39, No. 2, Jan. 15, 2014, pp. 193-196, XP001587214.

\* cited by examiner

METHOD FOR OBSERVING A SAMPLE

TECHNICAL FIELD

The technical field of the invention is related to the observation of a sample, in particular a biological sample, by lensless imaging, implementing a holographic reconstruction algorithm with improved performance.

PRIOR ART

The observation of samples, and in particular biological samples, by lensless imaging has seen substantial growth over the last 10 years. This technique allows a sample placed between a light source and a matrix-array photodetector to be observed without the need to place any magnifying optical lenses between the sample and the photodetector. Thus, the photodetector collects an image of the light wave transmitted by the sample.

This image is formed of interference patterns formed by interference between the light wave emitted by the source and transmitted by the sample, and diffracted waves resulting from the diffraction, by the sample, of the light wave emitted by the source. These interference patterns are sometimes referred to as diffraction patterns.

Document WO2008090330 describes a device allowing biological samples, in fact cells, to be observed by lensless imaging. The device allows an interference pattern to be associated with each cell, the morphology of the interference pattern allowing the type of cell to be identified. Lensless imaging would thus appear to be a simple and inexpensive alternative to conventional microscopy. In addition, its field of observation is clearly larger that of a microscope can be. Thus it will be understood that the potential avenues of application associated with this technology are many. This document also mentions that it is possible to illuminate the sample using light sources of various wavelengths.

Document US2012/0218379, published after the preceding document, echoes most of the teachings of WO2008090330, while also mentioning the possible use of a color matrix-array photodetector; however, the color information is subsequently processed to form a monochromatic image.

Generally, the image formed on the matrix-array photodetector, including the interference patterns, may be processed with a digital propagation algorithm, so as to estimate optical properties of the sample. Such algorithms are well known in the field of holographic reconstruction. To do this, the distance between the sample and the photodetector being known, a propagation algorithm taking into account this distance, and the wavelength, is applied. It is then possible to reconstruct an image of an optical property of the sample. A digital reconstruction algorithm is for example described in US2012/0218379.

It is also known that such algorithms may generate an image affected by a source of substantial background noise, referred to as the "twin image". Such noise is due to the fact that the initial image, formed by the photodetector, contains only partial information on the light wave collected by the photodetector. Specifically, an image provides information only on the real part of the light wave, this information being obtained from the measured intensity. However such an image contains no information on the imaginary part of the light wave to which the detector is exposed, in particular its phase. The reconstruction algorithm therefore uses incomplete information, this resulting in the appearance of noise in the reconstructed image.

Such background noise may complicate the interpretation of images reconstructed by digital propagation; it is important to decrease the influence thereof via suitable algorithms.

To do this, the publication "Lensless phase contrast microscopy based on multiwavelenth Fresnel diffraction", Optics Letters Vol. 39, No. 2, 15 Jan. 2014, describes an algorithm allowing the quality of reconstructed images to be improved. This publication describes a lensless imaging device based on the use of three light sources of different wavelengths (685 nm, 785 nm and 940 nm, respectively). The sample is illuminated in succession by these three light sources. The photodetector then acquires as many images as there are light sources, these images being formed in a plane, called the detector plane, in which the sensor lies. To each image corresponds one wavelength.

A first image, of a first wavelength, is back propagated, depending on said first wavelength, to a plane in which the object lies, called the object plane, so as to obtain, in this object plane, a complex first field. The phase of this complex first field, in the object plane, is multiplied by a ratio between the first wavelength and a second wavelength. This complex field is then propagated, depending on said second wavelength, from the object plane to the detector plane, subsequent to which its modulus is replaced by the modulus of the image acquired at said second wavelength. It is then back propagated to the object plane, for a second iteration. The iterative method continues until a convergence criterion has been reached. Document WO2014035238, certain of the inventors of which are the authors of the aforementioned publication, contains the same teachings.

The publication Bao P. "Optical surface profile measurement using phase retrieval by, tuning the illumination wavelength", Optics Communications 285, 5029-5036, 2012 describes an iterative algorithm allowing a three-dimensional surface of a transparent object to be reconstructed on the basis of an image acquired by an image sensor in a lensless configuration. This algorithm aims to illuminate an object using two wavelengths. The image acquired by the image sensor, at each wavelength, is propagated to an object plane. A phase difference is then estimated, at each of these wavelengths, in the object plane. The three-dimensional surface is reconstructed on the basis of the phase difference thus estimated.

Document WO2015/015023 describes an iterative holographic reconstruction algorithm based on a color image sensor in a lensless configuration. According to this algorithm, the sample is illuminated with a polychromatic light source. The acquired image is decomposed into various spectral components. Each component is back propagated to a plane in which the sample lies, the propagation of the components being carried out over distances that are different from one another. This document then describes mixing spectra of each hologram in the Fourier domain, this allowing a single image to be generated, the latter being used in a subsequent iterative loop.

The inventors provide an alternative method to those provided in the preceding publications, allowing optical properties of a sample to be reliably estimated.

SUMMARY OF THE INVENTION

A first subject of the invention is a method for observing a sample, including the following steps:
i) illuminating said sample using a light source that is able to produce a light wave that propagates along a propagation axis;

ii) acquiring, using a photodetector, a plurality of images of the sample, said images being formed in a detection plane, the sample being placed between the light source and the photodetector, each image being representative of a light wave, transmitted by the sample, under the effect of said illumination, each image being acquired in a spectral band that is different from the others;
the method being characterized in that it also comprises the following steps:
  iii) determining, on the basis of each image acquired in a spectral band, an initial complex amplitude of the transmitted light wave, in said spectral band, in said detection plane;
  iv) back propagating each complex amplitude established in the detection plane, in a spectral band, in order to determine a complex amplitude of the transmitted wave, in each spectral band, in a plane in which the sample lies;
  v) combining a plurality of complex amplitudes determined in step iv), in various spectral bands, in order to calculate a weighting function in the sample plane;
  vi) projecting said weighting function onto the detection plane so as to obtain, for each spectral band, a weighting function in said detection plane;
  vii) updating each complex amplitude of the transmitted light wave, in each spectral band, in the detection plane, using said weighting function determined, in said spectral band, in step vi);
  viii) repeating steps iv to vii until a stop criterion is reached.

Thus, each iteration comprises propagating, in an operation referred to as back propagation, from the detector plane to the sample plane, a plurality of complex amplitudes, in various spectral bands. These various complex amplitudes are combined, in the sample plane, to form a weighting function. This combination, in the sample plane, of a plurality of complex amplitudes, corresponding to various spectral ranges, has the effect of smoothing the noise affecting each thereof, this noise being the consequence of the back propagation.

The weighting function is then propagated from the sample plane to the detection plane, where it is used to form a new estimation of the complex amplitude of the light wave to which the sample is exposed, in each spectral band in question.

Alternatively to the methods described in the prior art, the weighting function, in said sample plane, may be calculated by calculating a weighted sum of various complex amplitudes, or of their logarithms, in the sample plane, of the transmitted light wave, said complex amplitudes respectively being associated with various spectral bands. The weighting function, in said sample plane, may also be determined by calculating a weighted sum of the modulus and/or argument of various complex amplitudes, in the sample plane, of the transmitted light wave, said complex amplitudes respectively being associated with various spectral bands.

By transmitted light wave, what is meant is the light wave to which the photodetector is exposed.

The method may comprise any one of the following features alone or in any technically possible combination:
  In step iii), the modulus of the complex amplitude of the transmitted wave transmitted in a spectral band is determined by normalizing the intensity of the image measured by the photodetector 16, in said spectral band, by a reference intensity measured by said photodetector in the absence of sample.

In step iv), the complex amplitude in a sample plane, in a spectral band, is determined by applying a propagation-axis propagation operator to said complex amplitude defined in the same spectral band in the detection plane.

In step vi), said weighting function, in the detection plane, is obtained by applying a propagation-axis propagation operator to the weighting function determined, in the sample plane, in step v).

In step vii), the modulus of the complex amplitude of the transmitted light wave, in a spectral band, in the detection plane, is calculated depending on the modulus of said initial complex amplitude, in said spectral band.

In step vii), the argument of the complex amplitude of the transmitted light wave, in a spectral band, in the detection plane, is calculated depending on the argument of the weighting function determined, in said detection plane and in said spectral band, in step vi).

In step v), said weighting function may be common to all the spectral bands. Alternatively, this step v) may comprise determining a plurality of weighting functions, each weighting function being associated with one spectral band.

The method may include, following step viii), the step ix) of forming an image representative of the modulus or of the argument of the complex amplitude of the wave transmitted by the sample, in the sample plane or in the detection plane, in at least one spectral band ($\lambda_i$).

Another subject of the invention is a device for observing a sample including:
  a light source that is suitable for illuminating said sample;
  a photodetector, the sample being placed between the light source and the photodetector,
  the photodetector being suitable for forming a plurality of images, in a detection plane, of a light wave transmitted by the sample under the effect of illumination by said light source, each image being obtained in a spectral band that is different from the others; and
  a processor that is suitable for processing said plurality of images by executing instructions, programmed into a memory, implementing a method such as described above.

SUMMARY OF PARTICULAR EMBODIMENTS

Figure 1:
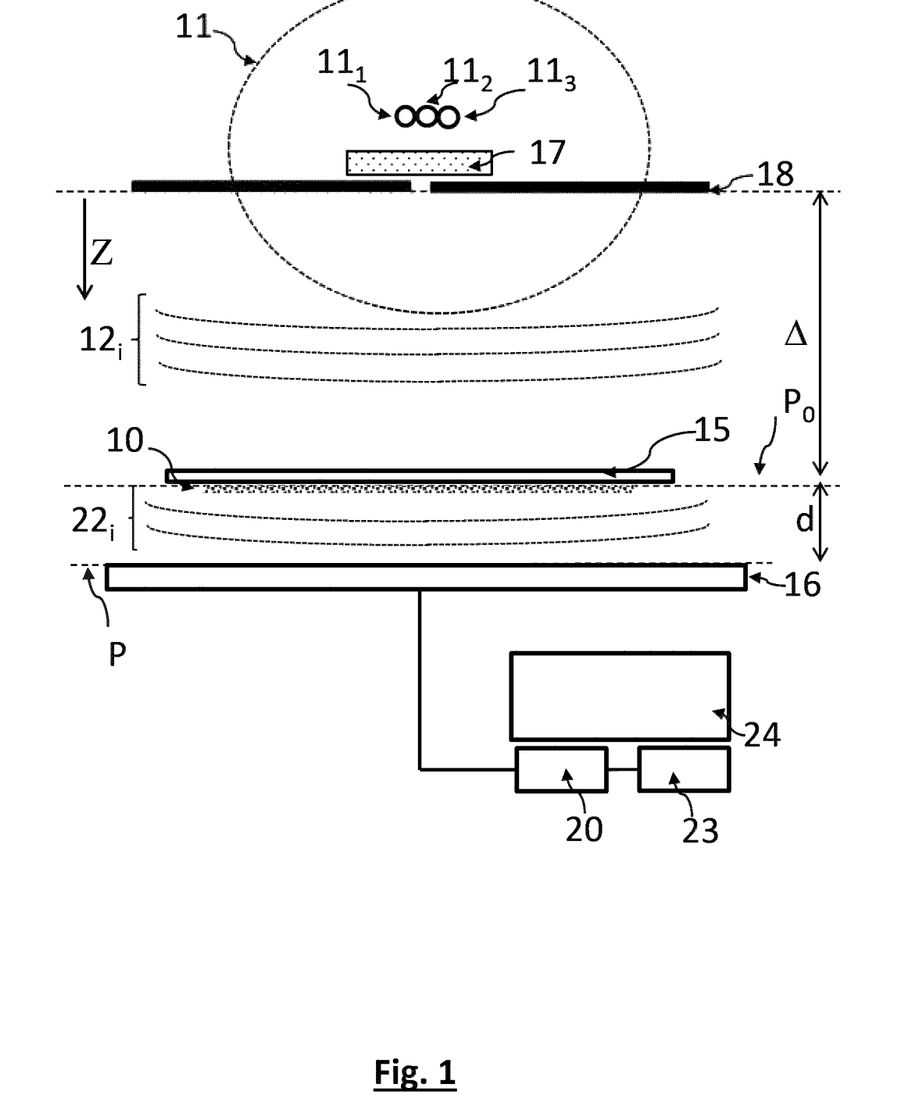
FIG. 1 shows a first example of a device for implementing the invention, the analyzed sample being an anatomopathology slide.

FIG. 1 shows an example of a device falling within the scope of the invention. A light source 11 is able to emit a light wave 12, called the incident light wave, in the direction of a sample 10, along a propagation axis Z.

The sample 10 may be a biological sample that it is desired to characterize. It may for example be a tissue slide, or an anatomopathology slide, including a small thickness of tissue deposited on a transparent slide 15. By small thickness, what is meant is a thickness preferably smaller than 100 µm, and preferably smaller than 10 µm, typically a few microns. Such a sample is shown in FIG. 1. It may be seen that the sample lies in a plane $P_0$, called the sample plane, perpendicular to the propagation axis Z.

Figure 2:
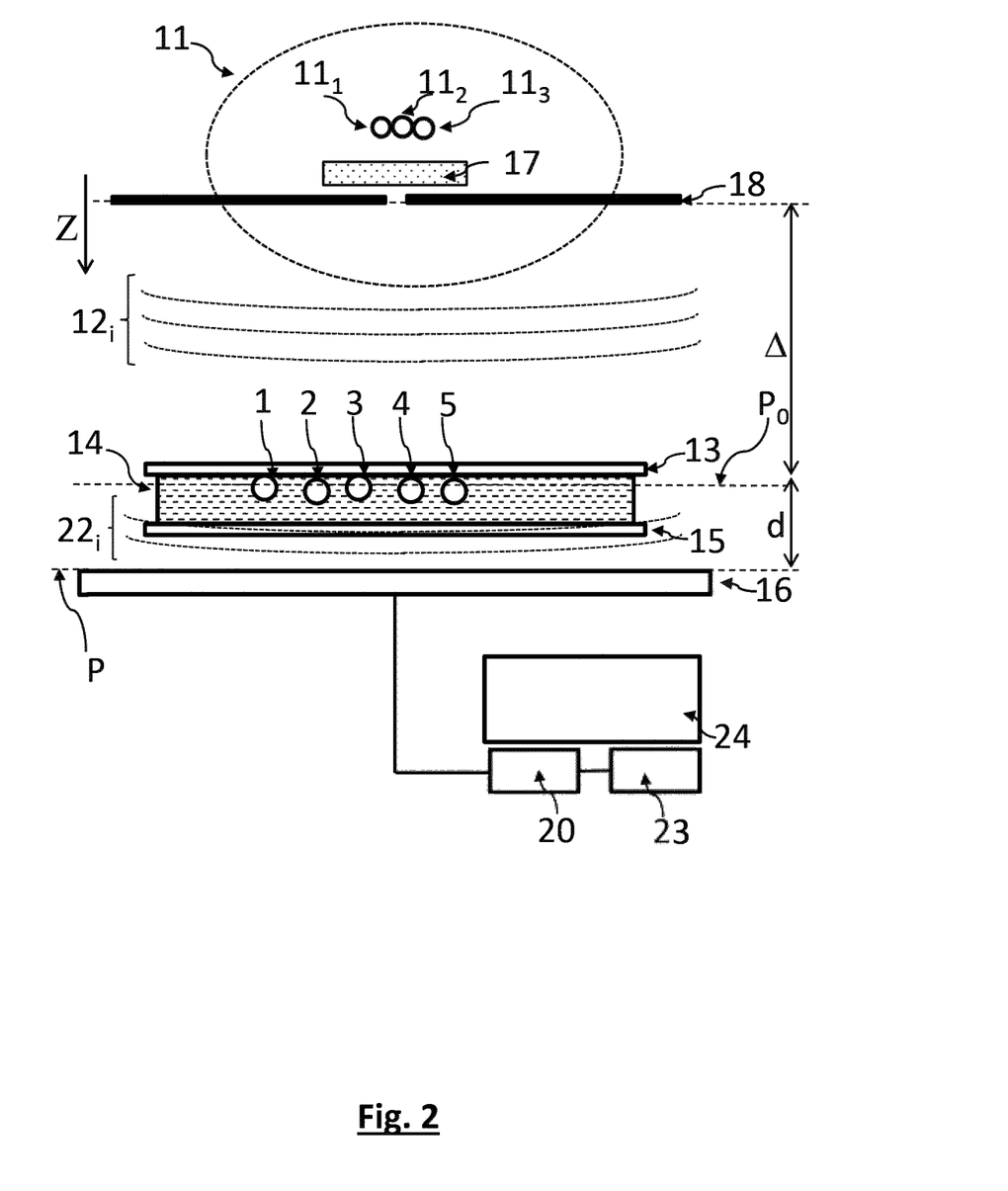
FIG. 2 shows a first example of a device for implementing the invention, the analyzed sample being a bodily liquid containing particles.

The sample 10 may also include a solid or liquid medium 14 containing particles 1, 2, 3, 4, 5 to be characterized, such a case being shown in FIG. 2. It may for example be a question of biological particles in a culture medium, or in a bodily liquid. By biological particle, what is meant is a cell, a bacterium or another microorganism, a mushroom, a spore, etc. The term particles may also designate microbeads, for example metal microbeads, glass microbeads or organic microbeads, which are commonly implemented in biological protocols. It may also be a question of insoluble droplets submerged in a liquid medium, for example lipid droplets in an oil-in-water type emulsion. Thus, the term particle designates both endogenous particles, initially present in the examined sample, and exogenous particles, added to this sample before analysis.

Generally, a particle has a size advantageously smaller than 1 mm, or even smaller than 500 µm, and preferably a size comprised between 0.5 µm and 500 µm.

The distance Δ between the light source and the sample is preferably larger than 1 cm. It is preferably comprised between 2 and 30 cm. Preferably, the light source, seen by the sample, may be considered to be a point source. This means that its diameter (or its diagonal) is preferably smaller than one tenth and better still one hundredth of the distance between the sample and the light source. Thus, preferably, the light reaches the sample in the form of plane waves, or waves that may be considered as such.

The light source 11 is able to produce a plurality of incident light waves $12_1 \ldots 12_n$, each $i^{th}$ light wave $12_i$ lying in an $i^{th}$ spectral band $\lambda_i$. The spectral bands $12_1 \ldots 12_n$ are different from one another, and, preferably, do not overlap.

In the example device shown in FIGS. 1 and 2, the light source includes three elementary light sources, namely three light-emitting diodes (LEDs) $11_1$, $11_2$ and $11_3$ emitting in the spectral bands $\lambda_1$=450 nm-465 nm; $\lambda_2$=520 nm-535 nm; $\lambda_3$=620 nm-630 nm, respectively. Preferably, there is no overlap between the various spectral bands; a negligible overlap, for example concerning less than 25% and better still less than 10% of the light intensity emitted, is however envisionable. In this example, the light source 11 includes a Cree (registered trademark) XLamp (registered trademark) MC-E multi-LED diode. This diode includes four individually addressable elementary light-emitting diodes, only three of which are implemented in the context of this invention, the fourth being a white LED. The elementary light sources may be temporally coherent sources, such as laser diodes. Other configurations of light sources 11 are possible and described below.

The light source 11 is preferably a point source. It may in particular comprise a diaphragm 18, or spatial filter. The aperture of the diaphragm is typically comprised between 5 µm and 1 mm, preferably between 50 µm and 500 µm, and is for example 150 µm. The diaphragm may be replaced by an optical fiber, a first end of which is placed facing one elementary light source $11_1$, $11_2$ or $11_3$, and a second end of which is placed facing the sample.

The light source 11 preferably includes a diffuser 17, placed between each elementary light source $11_1$, $11_2$ and $11_3$ and the diaphragm 18. The inventors have observed that the use of such a diffuser allows constraints on the centrality of each elementary light source with respect to the aperture of the diaphragm to be relaxed. In other words, the use of such a diffuser allows an elementary light source $11i$, with $1 \leq i \leq 3$, that is slightly off center with respect to the aperture of the diaphragm 18 to be used. In this example, the diaphragm is sold by Thorlabs under the reference P150S.

Preferably, each elementary light source $11_i$ is of small spectral width, for example smaller than 100 nm, or even than 20 nm. The term spectral width designates the full width at half maximum of the emission band of the light source in question.

In this example, the diffuser implemented is a 40° diffuser (reference Light Shaping Diffuser 40°, manufactured by Luminit). The function of such a diffuser is to distribute the light beam, produced by an elementary light source $11_i$, over a cone of angle α, α being equal to 40° in the present case. Preferably, the scattering angle α varies between 10° and 60°.

The sample 10 is placed between the light source 11 and a matrix-array photodetector 16. The latter preferably lies parallel, or substantially parallel to the transparent slide 15 holding the sample.

The term substantially parallel means that the two elements may not be rigorously parallel, an angular tolerance of a few degrees, smaller than 10° being acceptable.

The photodetector 16 is an imager, able to form an image in a detection plane P. In the example shown, it is a CCD or CMOS matrix-array photodetector including a pixel matrix-array. CMOS photodetectors are preferred, because the size of the pixels is smaller, thereby allowing images to be acquired the spatial resolution of which is more favorable. In this example, the detector is a CMOS sensor sold by Omnivision under the reference OV5647. It is an RGB CMOS sensor comprising 2592×1944 pixels, with an inter-pixel pitch of 1.4 µm. The useful area of the photodetector is 3.6×2.7 mm². The detection plane P preferably lies perpendicular to the propagation axis Z of the incident light wave 12.

Preferably, the photodetector comprises a pixel matrix-array, above which matrix array is placed a transparent protective window. The distance between the pixel matrix-array and the protective window is generally comprised between a few tens of µm to 150 or 200 µm. Photodetectors, the inter-pixel pitch of which is smaller than 3 µm, are preferred, in order to improve the spatial resolution of the image. The photodetector may comprise a mirror-type system for redirecting images toward a pixel matrix-array, in which case the detection plane corresponds to the plane in which the image-redirecting system lies. Generally, the detection plane P corresponds to the plane in which an image is formed.

The distance d between the sample 10 and the pixel matrix-array of the photodetector 16 is, in this example, equal to 300 μm. Generally, whatever the embodiment, the distance d between the sample and the pixels of the photodetector is preferentially comprised between 50 μm and 2 cm, and preferably comprised between 100 μm and 2 mm.

The absence of magnifying optics between the photodetector 16 and the sample 10 will be noted. This does not prevent focusing micro-lenses optionally being present level with each pixel of the photodetector 16, these lenses not having the function of magnifying the image.

Figure 3:
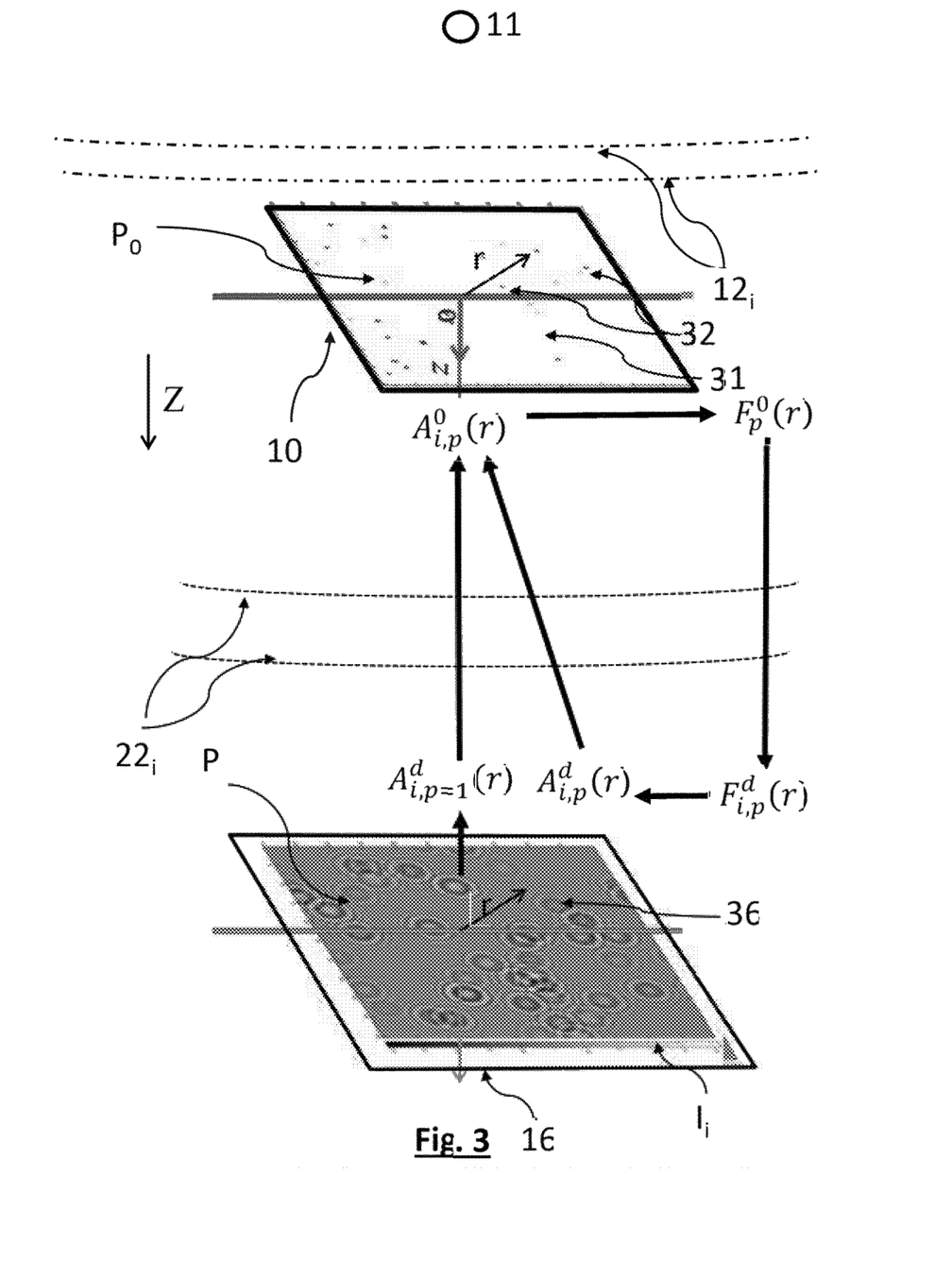
FIG. 3 shows the detection plane, on which an image is formed, and the sample plane. This figure also illustrates the relationships between the main quantities implemented in the various described embodiments.

FIG. 3 shows a sample 10, including diffracting objects 32 placed around non-diffracting or not very diffracting zones 31, which are qualified poor zones below. The sample may be solid, for example in the case of a tissue deposited on an anatomopathology slide. It may also be liquid, for example in the case of a bodily liquid or a cell culture medium.

The photodetector 16 is able to produce an image $I_i$ of a light wave $22_i$ transmitted by the sample 10 when the latter is illuminated by an incident wave $12_i$, in the $i^{th}$ spectral band $\lambda_i$. The spectral band of the transmitted light wave $22_i$ includes all or some of the spectral band of the incident wave $12_i$. The light wave $22_i$, transmitted by the sample, in the spectral band $\lambda_i$, results from the interaction of the sample 10 with the incident light wave $12_i$ produced by the elementary light source $11_i$.

Under the effect of the incident light wave $12_i$, the sample 10 may generate a diffracted wave that is liable to produce, level with the detection plane P, interference, in particular with a portion of the incident light wave $12_i$ transmitted by the sample. This interference gives rise, in the image acquired by the photodetector, to a plurality of elementary diffraction patterns, each elementary diffraction pattern 36 including a central zone and a plurality of concentric diffraction rings. Each elementary diffraction pattern 36 is due to one diffracting object 32 in the sample.

Moreover, the sample may absorb a portion of the incident light wave $12_i$. Thus, the light wave $22_i$, in a spectral band $\lambda_i$, transmitted by the sample, and to which the matrix-array photodetector 16 is exposed, may comprise:
 a component resulting from the diffraction, described above, this diffraction component possibly in particular resulting in the presence of elementary diffraction patterns on the photodetector 16, each elementary diffraction pattern possibly being associated with one diffracting element 32 of the sample. Such a diffracting element may be a cell, or a particle, or any other diffracting object 32 present in the sample 10.
 a component resulting from the absorption of the incident light wave $12_i$ in the sample.

A processor 20, for example a microprocessor, is able to process each image generated by the matrix-array photodetector 16. In particular, the processor is a microprocessor connected to a programmable memory 23 in which a sequence of instructions for carrying out the calculating and image-processing operations described in this description is stored. It may also be connected to a display screen 24.

Figure 4:
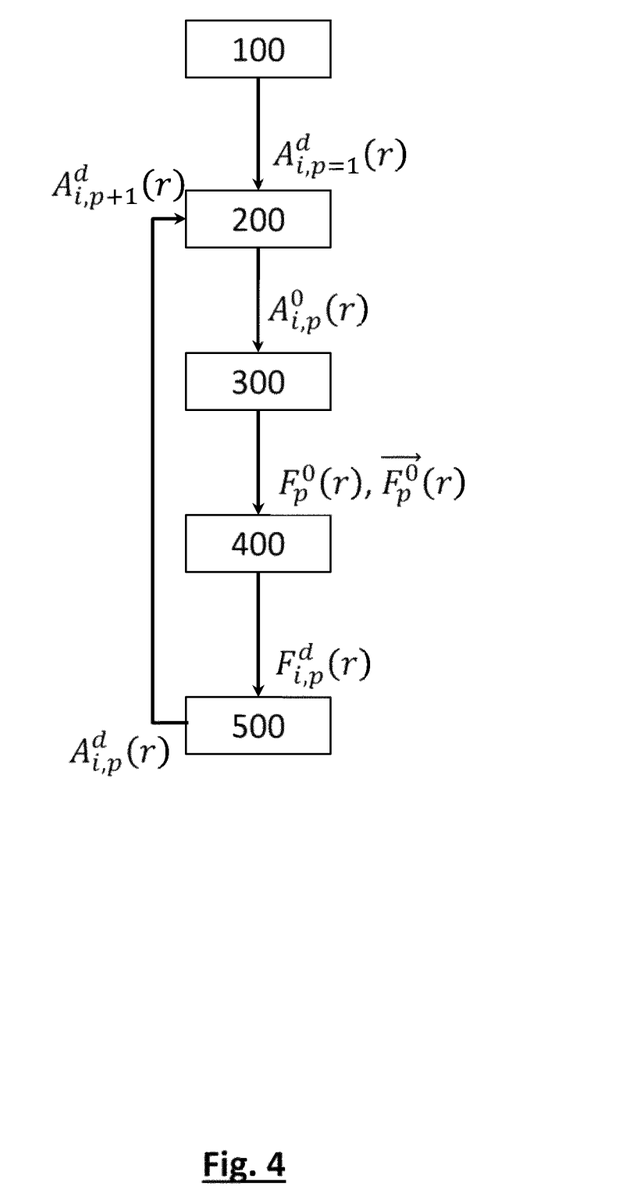
FIG. 4 shows a flowchart illustrating the sequence of the main steps of an iterative reconstructing method.

The steps of an iterative method for obtaining an image of the sample 10 will be described below with reference to FIGS. 3 and 4.

$1^{st}$ Step: Initialization

In a first step 100 of acquiring images, each elementary light source $11_i$ of the light source 11 is activated in succession, each light source emitting an incident light wave ($12_1, \ldots 12_N$), in a spectral band ($\lambda_1, \ldots \lambda_N$), along a propagation axis Z, in the direction of the sample 10.

In each acquisition, the matrix-array photodetector captures an image $I_i$ corresponding to a spectral band $\lambda_i$, the index i, relating to the spectral band, being comprised between 1 and N, N being the number of spectral bands in question. In the example shown in FIGS. 1 and 2, the light source 11 includes three elementary light sources $11_1$, $11_2$ and $11_3$. The photodetector captures three images $I_1$, $I_2$, $I_3$, corresponding to the spectral bands $\lambda_1$, $\lambda_2$ and $\lambda_3$, respectively.

The sample is placed at an axial coordinate z=0, along the propagation axis Z. The letter r designates a radial coordinate, i.e. a coordinate in a plane perpendicular to the propagation axis Z. The plane z=d corresponds to the detection plane, whereas the plane z=0 corresponds to a plane passing through the sample, called the sample plane and denoted $P_0$.

If $I_i^{z=d}(r) = I_i^d(r)$ designates the value of the intensity captured, in the spectral band $\lambda_i$, by the pixel of the detector of radial coordinate r in the detection plane, it is possible to establish, using the image $I_i$, a complex amplitude $60_i^{z=d}(r) = \alpha_i^d(r)$ of the wave $22_i$ at said pixel of coordinate r, the modulus of which may be expressed by the expression:

$$|\alpha_i^d(r)| = \sqrt{I_i^d(r)}$$

The exponent d expresses the fact that the complex amplitude is determined in the sample plane P, of equation z=d. The complex amplitude $\alpha_i^d(r)$ includes a modulus and an argument, such that:

$$\alpha_i^d(r) = M_i^d(r) e^{j\varphi_i^d(r)}$$

where:
 $M_i^d(r)$ is the modulus of the complex amplitude of the light wave detected by the photodetector, in the $i^{th}$ spectral band $\lambda_i$, at a radial coordinate r in the detection plane; and
 $\varphi_i^d(r)$ is the phase of the complex amplitude of the light wave detected by the photodetector, in the $i^{th}$ spectral band $\lambda_i$, and at said radial coordinate r in the detection plane.

However, the matrix-array photodetector delivers no information on the phase of the light wave. Thus, in step 100, $e^{j\varphi_i^d(r)}$ is considered to be equal to an arbitrary initial value, for example equal to 1.

The complex amplitude $\alpha_i^d(r)$ may be expressed, normalized, by the expression:

$$A_i^d(r) = \frac{\alpha_i^d(r)}{\sqrt{I_i^{mean}}}$$

where:
 $I_i^{mean}$ is the mean intensity of the light wave $12_i$ emitted by the light source 11 in the $i^{th}$ spectral band $\lambda_i$; this mean intensity may be determined experimentally, by placing the photodetector 16 facing the light source 11, without a sample placed therebetween, and by calculating the mean of the pixels of the image acquired by the photodetector 16.
 $A_i^d(r)$ is the normalized complex amplitude of the light wave $22_i$ detected by the matrix-array photodetector 16 in the $i^{th}$ spectral band $\lambda_i$.

The normalization may also be carried out by dividing the complex amplitude $\alpha_i^d(r)$ by $I_i^{mean}(r)$, this term representing the light intensity, at the radial coordinate r, measured in the absence of sample.

The normalized complex amplitude $A_i^d(r)$ includes a modulus and an argument, such that:

$$A_i^d(r) = m_i^d(r) e^{j\varphi_i^d(r)}$$

where:
- $m_i^d(r)$ is the modulus of the normalized complex amplitude $A_i^d(r)$; and
- $\varphi_i^d(r)$ is the phase of the normalized complex amplitude, which is also the phase of the complex amplitude $\alpha_i^d(r)$.

The first step 100 allows, on the basis of the image $I_i$ detected by the photodetector in the $i^{th}$ spectral band $\lambda_i$, an initial value to be assigned to each complex amplitude $\alpha_i^d(r)$ or to each normalized complex amplitude $A_i^d(r)$, such that:

$$\alpha_{i,p=1}^d(r) = M_i^d(r) = \sqrt{I_i^d(r)}$$

or $$A_{i,p=1}^d(r) = m_i^d(r) = \sqrt{\frac{I_i^d(r)}{I_i^{mean}}}.$$

The index p corresponds to the rank of the iteration of the iterative method described below. Step 100 being an initialization step, the value 1 is attributed to this index.

By addressing all or some of the pixels r of the photodetector 16, a complex image, or complex field, of the light wave $22_i$ in the detector plane is obtained, this image containing the complex amplitudes $\alpha_i^d(r)$ or the normalized complex amplitudes $A_i^d(r)$.

In the rest of the description, only the normalized complex amplitude $A_i^d(r)$ will be considered, though the reasoning also applies to the complex amplitude $\alpha_i^d(r)$.

This first step is repeated for each spectral band ($\lambda_1 \ldots \lambda_N$) detected by the photodetector.

$2^{nd}$ Step: Back Propagation to the Sample Plane $P_0$

During a second step 200, the normalized complex amplitude $A_{i,p}^d(r)$ of the wave $22_i$ to which the detector is exposed is estimated, in the sample plane $P_0$. This estimation is made by back propagating the normalized complex amplitude $A_{i,p}^d(r)$, determined in the detection plane P, from the detection plane P to the sample plane $P_0$.

The index p designates the rank of the iteration. In the first iteration (p=1), the initial normalized complex amplitude $A_{i,p=1}^d(r) = A_i^d(r)$ obtained at the end of the first step 100 is used. In the following iterations (p>1), the complex amplitude resulting from the preceding iteration is used, as will be detailed below.

According to well-known principles of digital holographic reconstruction, by determining the product of a convolution between the complex amplitude of the light wave $22_i$ determined, for the spectral band $\lambda_i$, in the detection plane z=d, and a propagation operator h(r,z), it is possible to reconstruct a complex amplitude of the same light wave at any point of spatial coordinates (r,z), and in particular in the sample plane $P_0$.

In other words, the normalized complex amplitude $A_{i,p}^z(r)$ of the light wave $22_i$ may be obtained, at a point of coordinates (r, z), on the basis of $A_{i,p}^{z=d}(r)$, via the operation:

$$A_{i,p}^z(r) = A_{i,p}^{z=d}(r) * h_{\lambda_i}(r, z-d),$$

where $h_{\lambda,i}$ is the propagation operator in the spectral band $\lambda_i$.

When the reconstruction is carried out in the direction of propagation of the light, for example from the sample to the photodetector, propagation is spoken of. When the reconstruction is carried out in the direction opposite the direction of propagation of the light, for example from the photodetector to the sample, back propagation is spoken of.

The propagation operator may in particular be based on the Fresnel diffraction model. In this example, the propagation operator is the Fresnel-Helmholtz function:

$$h(r, z) = \frac{1}{j\lambda z} e^{j2\pi \frac{z}{\lambda}} \exp\left(j\pi \frac{r^2}{\lambda z}\right)$$

where $\lambda$ is the wavelength.

Thus, $$A_{i,p}^{z=0}(r) = A_{i,p}^0(r) =$$

$$A_{i,p}^{z=d}(r) * h_{\lambda i}(r, -d) = -\frac{1}{j\lambda_i z} e^{-j2\pi \frac{z}{\lambda_i}} \int\int A_{i,p}^d(r') \exp\left(-\left(j\pi \frac{(r-r')^2}{\lambda_i d}\right)\right) dr'$$

where
- r' designates the radial coordinates in the plane of the photodetector (z=d);
- r designates the radial coordinates in the reconstruction plane (z=0); and
- $\lambda_i$ is the central wavelength of the spectral band in question.

$A_{i,p}^0(r)$ is therefore obtained by back propagating $A_{i,p}^d(r)$ over the distance d separating the detection plane P from the sample plane $P_0$.

This second step is repeated for each spectral band ($\lambda_1 \ldots \lambda_N$) emitted by the light source 11 or, more generally, for each spectral band ($\lambda_1 \ldots \lambda_N$) respectively associated with each image ($I_1 \ldots I_N$) detected by the photodetector 16.

It is possible, at this stage, to establish an image of the modulus or of the phase of the complex amplitude $A_{i,p}^0(r)$ of each light wave $22_i$, in the sample plane $P_0$, whether the complex amplitude be normalized or not, by calculating the value of $A_{i,p}^0(r)$ at the various coordinates r in the sample plane.

Each image of the modulus of the complex amplitude $A_{i,p}^0(r)$ is representative of the intensity of the light wave level with the sample, whereas each image of the argument of the complex amplitude $A_{i,p}^0(r)$ is representative of the phase of the intensity of the light wave level with the sample.

When, as in the present case, three spectral bands centered respectively on wavelengths in the blue, green and red, are used, the information contained in the three images allows a color image of the sample to be obtained.

It will be noted that the normalized complex amplitude $A_{i,p}^0(r)$ is equivalent to a transmission function describing transmission of the incident wave $12_i$ by the sample 10 at the radial coordinate r.

$3^{rd}$ Step: Determining the Weighting Function

In the step 300, a weighting function, denoted $F_p^0(r)$, allowing the complex amplitude of the light wave transmitted by the sample in the various spectral bands $\lambda_i$ in question to be weighted, is determined, in the sample plane.

According to this example, the weighting function $F_p^0(r)$, in the sample plane, may be common to each spectral band. It is obtained by combining the normalized complex amplitudes $A_{i,p}^0(r)$ of the light wave transmitted by the sample, in the sample plane $P_0$ and in the various spectral bands $\lambda_i$.

According to one example, the weighting function is obtained via a weighted sum of each complex amplitude determined in step 200, in the sample plane $P_0$, using the expression:

$$F_p^0(r) = \frac{1}{\sum_i k_i} \sum_i k_i A_{i,p}^0(r)$$

where $k_i$ is a positive weighting factor associated with the $i^{th}$ spectral band $\lambda_i$.

The weighting factors may be equal to one another, for example equal to ⅓.

Other ways of determining the weighting function, in the sample plane, are detailed below.

4$^{th}$ Step: Propagation of the Weighting Function to the Detector Plane

The step 400 aims to propagate, from the sample plane $P_0$ to the detector plane P, the weighting function $F_p^0(r)$ determined, in the preceding step, in the sample plane $P_0$. Since the propagation operator is dependent on wavelength, this propagation is carried out for each spectral band $\lambda_i$ in question.

Thus, for each spectral band $\lambda_i$, $F_{i,p}^d(r)=F_p^0(r)*h_{\lambda_i}(r,z=d)$.

When the propagation operator is a Fresnel-Helmholtz operator such as defined above, $$F_{i,p}^d(r) = \frac{1}{j\lambda_i d} e^{-j2\pi \frac{d}{\lambda_i}} \int\int F_{i,p}^0(r')\exp\left(j\pi \frac{(r-r')^2}{\lambda_i d}\right)dr'$$

Since the propagation operator is dependent on wavelength, as many weighting functions are determined, in the detection plane, as there are spectral bands.
- r' designates the radial coordinates in the sample plane (z=0);
- r designates the radial coordinates in the reconstruction plane, i.e. in the detector plane (z=d); and
- $\lambda_i$ is the central wavelength of the spectral band in question.

5$^{th}$ Step: Update of the Complex Amplitude in the Detector Plane

In the step 500, the value of the weighting function, in the detection plane z=d, is used to update the estimation of the normalized complex amplitude $A_{i,p}^d(r)$ of the light wave 22$_i$ to which the photodetector 16 is exposed in the spectral band $\lambda_i$.

The updating formula is:

$$A_{i,p}^d(r) = m_i^d(r) \times \frac{F_{i,p}^d(r)}{|F_{i,p}^d(r)|} = m_i^d(r) \times e^{j\varphi_{i,p}^d(r)}$$

where:
- $|F_{i,p}^d(r)|$ is the modulus of $F_{i,p}^d(r)$;
- $m_i^d(r)$ is the modulus of the normalized initial complex amplitude $A_{i,p}^d(r)$ determined, on the basis of the image $I_i$, in the first step 100. This term serves as a link to the measured data;
- $\tilde{\varphi}_{i,p}^d$ is an estimation of the phase of the complex amplitude of the wave 22$_i$ in the $i^{th}$ spectral band $\lambda_i$; and $A_{i,p}^d(r)$ is the complex amplitude of the light wave 22$_i$ transmitted by the sample, in the plane of the photodetector 16, this complex amplitude forming the base of the following iteration.

Following this step, a new iteration may start, the input datum of this new iteration p+1 being $A_{i,p+1}^d(r)=A_{i,p}^d(r)$, this new iteration starting with the back propagation of each normalized complex amplitude $A_{i,p+1}^d(r)$, for the various spectral bands in question, to the sample plane $P_0$, according to step 200.

Steps 200 to 500 are carried out iteratively, either to a preset number of iterations $p_{max}$ or until a convergence criterion is reached, the latter possibly being, for example, expressed in the form of a discrepancy between the estimation of two given quantities in two successive iterations. When this discrepancy is smaller than a given threshold ε, the convergence criterion is reached. For example, the process is stopped when one of these conditions is reached:

$$\left|\frac{F_{i,p}^d(r)}{|F_{i,p}^d(r)|} - \frac{F_{i,p+1}^d(r)}{|F_{i,p+1}^d(r)|}\right| < \varepsilon;$$

$$|F_{i,p}^0(r) - F_{i,p+1}^0(r)| < \varepsilon;$$

$$|A_{i,p}^0(r) - A_{i,p+1}^0(r)| < \varepsilon;$$

$$\mathrm{Arg}(A_{i,p}^0(r) - A_{i,p+1}^0(r)) < \varepsilon;$$

this list is not limiting.

At the end of the method, an estimation of the complex amplitude of the light wave 22$_i$, transmitted by the sample, and to which the photodetector is exposed, in the detector plane P, of equation z=d, and/or in the sample plane $P_0$, of equation z=0, is obtained, for each spectral band in question. Using the various complex amplitudes $A_{i,p}^0(r)$ reconstructed in the sample plane, a precise representation of the latter is obtained, in each of the spectral bands in question, in particular by forming images on the basis of the modulus or of the phase of said complex amplitudes.

As previously mentioned, when the spectral bands are spread over the visible spectrum, the modulus or phase images may be combined, for example superposed, so as to obtain representations in color.

It will be recalled that this algorithm, although described in relation to a normalized complex amplitude $A_i$, also applies to the non-normalized complex amplitude $\alpha_i$.

Contribution of the Weighting Function

One of the important points of this iterative algorithm is the construction of the weighting function $F^0(r)$ in the sample plane. Specifically, generally, it is insufficient to determine the complex amplitude of a light wave on the basis of an image acquired by a photodetector, because information as to the phase of the wave is not recorded by the photodetector, the latter being sensitive only to intensity, which corresponds to the modulus of the complex amplitude of the wave.

Thus, as indicated in the description of step 100, the complex amplitude $\alpha_i^d(r)$ or normalized complex amplitude $A_i^d(r)$ determined in this step contains no information as to the phase of the light wave that they represent. This lack of information results, during the back propagation from the detector plane P to the sample plane $P_0$, which is the subject matter of step 200, in the formation of artefacts that are referred to as twin images.

The inventors have observed that these artefacts mainly affect poor zones 31 located in the vicinity of diffracting elements 32, i.e., zones located between two adjacent diffracting elements 32. Furthermore, they have observed that these artefacts are liable to fluctuate as a function of wavelength. Thus, artefacts in the poor zones 31 may be averaged out statistically by combining, for various wavelengths, the complex amplitudes back propagated to the sample plane. This statistical smoothing then increases the signal-to-noise ratio in the complex image back propagated to the sample plane. Generally, the method amounts to:

obtaining an initial estimation $A_{i,p=1}^{d}(r)$ of the complex amplitude of the wave 22$_i$ transmitted by the sample, in the detector plane, and in a plurality of spectral bands (step 100);

back propagating each of these complex amplitudes to the sample plane, in order to obtain, in each spectral band, a complex amplitude $A_{i,p}^{0}(r)$ in the sample plane (step 200);

calculating a weighting function $F_p^{0}(r)$ weighting each complex amplitude in the sample plane (step 300), so as to decrease the influence of twin-image artefacts;

propagating said weighting function to the detector plane, for at least one spectral band (step 400); and updating the estimation of the complex amplitude $A_{i,p}^{d}(r)$ of the wave 22$_i$ transmitted by the sample, in the detector plane, and in a plurality of spectral bands, using the weighting function $F_{i,p}^{d}(r)$ propagated to the detector plane (step 500).

The updating formula of step 500 shows that in each iteration, the modulus $m_i^{d}(r)$ ($M_i^{d}(r)$, respectively) of the normalized complex amplitude $A_{i,p}^{d}(r)$ (of the complex amplitude $\alpha_i^{d}(r)$, respectively), in the detection plane, corresponds to that determined, in step 100, with each image $I_i$ formed by the photodetector 16 in the spectral band $\lambda_i$. In other words, in the various iterations, the modulus, in the detection plane, of the complex amplitude $\alpha_i^{d}(r)$ or of the normalized complex amplitude $A_{i,p}^{d}(r)$ does not vary and corresponds to that derived from the intensity measured by the photodetector.

In contrast, the algorithm tends to cause, in each update, a variation in the argument of the complex expression $A_{i,p}^{d}(r)$ or $\alpha_i^{d}(r)$, and in particular in the estimation of the phase $\varphi_{i,p}^{d}$, the latter being considered to be equal to the phase of the weighting function $F_{i,p}^{d}(r)$ propagated to the detector plane, at each wavelength $\lambda_i$.

Thus, in this algorithm, each iteration comprises:

updating the complex amplitude $A_{i,p}^{d}(r)$ of each light wave in the sample plane $P_0$ (step 200);

updating the argument of each complex amplitude $A_{i,p}^{d}(r)$, and in particular its phase, in the detection plane (step 500).

Generation of the Weighting Function

A first way of calculating the weighting function consists in assigning an equal weight to the various spectral bands $\lambda_i$ in question.

For example, the weighting function take the form $$F_p^0(r) = \frac{1}{\sum_i k_i} \sum_i k_i A_{i,p}^0(r),$$

where $k_i$ is the weighting factor, or weight, attributed to the $i^{th}$ spectral band $\lambda_i$, as described above with reference to step 300. Each weighting factor $k_i$ is positive and may have the same value, for example ⅓.

According to one variant, and this applies in particular in the case where the sample analyzed is dyed, in a spectral range $\lambda_0$, the moduli of the complex amplitudes of first light waves 22$_i$ the spectral bands $\lambda_i$ of which are close to the spectral range $\lambda_0$ have a higher value than the moduli of the complex amplitudes of second light waves the spectral bands of which are further from the wavelength $\lambda_0$. In such a case, it is preferable to under-weight the complex amplitudes of the first light waves, and to over-weight the complex amplitudes of the second light waves.

For example, if the sample is dyed using a blue dye, which corresponds in our example to the first spectral band $\lambda_1$, the weighting factor $k_1$ is lower than the weighting factors $k_2$ and $k_3$ associated with the spectral bands $\lambda_2$ (green) and $\lambda_3$ (red), respectively.

According to another variant, the modulus and the argument of each complex amplitude are weighted by independent weighting factors, such that $$|F_p^0(r)| = \frac{1}{\sum_i k_i} \sum_i k_i |A_{i,p}^0(r)|$$

$$\mathrm{Arg}(F_p^0(r)) = \frac{1}{\sum_i k_i'} \sum_i k_i' \mathrm{Arg}(A_{i,p}^0(r))$$

$k_i$ and $k'_i$ being weighting factors respectively associated with the modulus and the argument of the complex amplitude of the light wave 22$_i$, in the sample plane, in the spectral band $\lambda_i$.

According to another variant, the combination of the complex amplitudes $A_{i,p}^{0}(r)$ takes the form of a sum of logarithms, according to the expression:

$$\ln(F_p^0(r)) = \frac{1}{\sum_i k_i} \sum_i k_i \ln[A_{i,p}^0(r)]$$

According to another variant, rather than one weighting function $F_p^{0}(r)$, a plurality of weighting functions $F_{i,p}^{0}(r)$ are determined in the sample plane, each function being associated with one spectral band $\lambda_i$.

Each weighting function $F_{i,p}^{0}(r)$ associated with an $i^{th}$ wavelength is obtained by combining a plurality of complex amplitudes $A_{i,p}^{0}(r)$, respectively associated with various spectral bands.

In a first example, considering three spectral bands:

$$\begin{bmatrix} F_{1,p}^0 \\ F_{2,p}^0 \\ F_{3,p}^0 \end{bmatrix} = \begin{bmatrix} k_{1,1} & k_{1,2} & k_{1,3} \\ k_{2,1} & k_{2,2} & k_{2,3} \\ k_{3,1} & k_{3,2} & k_{3,3} \end{bmatrix} \begin{bmatrix} A_{1,p}^0(r) \\ A_{2,p}^0(r) \\ A_{3,p}^0(r) \end{bmatrix}$$

Thus, according to this embodiment, the weighting function takes the form of a vector $\vec{F_p^0}(r)$, of dimension N, N being the number of spectral bands in question, each term $F_{i,p}^{0}(r)$ of which is a weighting function associated with one spectral band $\lambda_i$. This weighting function may be obtained via the following matrix product:

$$\vec{F_p^0}(r) = K\vec{A_p^0}$$

Where K is a weighting matrix, each term $k_{i,j}$ of the weighting matrix representing the weight associated with the complex amplitude $A_{j,p}^0(r)$ associated with the spectral band $\lambda_j$ for the calculation of the weighting function associated with the spectral band $\lambda_i$.

The matrix K is a square matrix of N by N size, N being the number of spectral bands in question.

The weighting function is preferably normalized, such that each term $F_{i,p}^0$ may be expressed in the form:

$$F_{i,p}^0(r) = \frac{1}{\sum_j k_{i,j}} \sum_j k_{i,j} A_j^0(r)$$

the term $$\frac{1}{\sum_j k_{i,j}}$$

being a normalization term.

According to a second example of this embodiment, again considering three spectral bands, $$\begin{bmatrix} |F_{1,p}^0(r)| \\ |F_{2,p}^0(r)| \\ |F_{3,p}^0(r)| \\ \arg(F_{1,p}^0(r)) \\ \arg(F_{2,p}^0(r)) \\ \arg(F_{3,p}^0(r)) \end{bmatrix} = \begin{bmatrix} k_{1,1} & k_{1,2} & k_{1,3} & k_{1,4} & k_{1,5} & k_{1,6} \\ k_{2,1} & k_{2,2} & k_{2,3} & k_{2,4} & k_{2,5} & k_{2,6} \\ k_{3,1} & k_{3,2} & k_{3,3} & k_{3,4} & k_{3,5} & k_{3,6} \\ k_{4,1} & k_{4,2} & k_{4,3} & k_{4,4} & k_{4,5} & k_{4,6} \\ k_{5,1} & k_{5,2} & k_{5,3} & k_{5,4} & k_{5,5} & k_{5,6} \\ k_{6,1} & k_{6,2} & k_{6,3} & k_{6,4} & k_{6,5} & k_{6,6} \end{bmatrix} \begin{bmatrix} |A_{1,p}^0(r)| \\ |A_{2,p}^0(r)| \\ |A_{3,p}^0(r)| \\ \arg(A_{1,p}^0(r)) \\ \arg(A_{2,p}^0(r)) \\ \arg(A_{3,p}^0(r)) \end{bmatrix}.$$

Thus, according to this embodiment, the weighting function takes the form of a vector $\vec{F}_p^0(r)$, of dimension 2N, N being the number of spectral bands in question, each term of which is either the modulus or the argument of a weighting function $F_{i,p}^0(r)$ associated with one spectral band $\lambda_i$. This weighting function may be obtained via the following matrix product:

$$\vec{F}_p^0(r) = K \vec{A}_p^0$$

Where K is a weighting matrix, of 2N×2N size, each term $k_{i,j}$ of the weighting matrix representing the weight associated either with the argument or with the modulus of the complex amplitude $A_{j,p}^0(r)$ associated with the spectral band $\lambda_j$.

According to this embodiment, each coordinate of the vector $\vec{A}_p^0$ represents either the modulus, or the argument, of a complex amplitude $A_{j,p}^0(r)$, in a spectral band j.

Just as in the preceding example, the weighting function is preferably normalized, such that each term $F_{i,p}^0$ may be expressed in the form:

$$|F_{i,p}^0(r)| = \frac{1}{\sum_{j=1}^{3} k_{i,j}} \sum_{j=1}^{3} k_{i,j} |A_{j,p}^0(r)|$$

$$\mathrm{Arg}(F_{i,p}^0(r)) = \frac{1}{\sum_{j=4}^{6} k_{i,j}} \sum_{j=4}^{6} k_{i,j} \arg(A_{j,p}^0(r))$$

Whatever the circumstances, the coefficients of a weighting matrix may be determined beforehand, either arbitrarily or on the basis of experimental trials.

For example, it is possible to establish a linear regression coefficient between two components i and j of the vector $\vec{A}_p^0(r)$, by considering a plurality of radial positions (r) in the sample plane, so as to obtain a statistically significant sample. The coefficient $k_{ij}$ of weighting matrix may then be determined depending on this linear regression coefficient $\alpha_{ij}$, optionally assigned a term taking into account the dispersion around the linear regression model. In such a case, the diagonal of the weighting matrix may consist of coefficients $k_{ii}$ equal to 1.

This allows a weighting function $F_{i,p}^0$, associated with the wavelength $\lambda_i$, taking into account the correlation between the various terms of the vector $\vec{A}_p^0(r)$ to be established.

Variants Regarding the Light Source or the Photodetector.

In the examples given with reference to FIGS. 1 and 2, the light source 11, able to emit a light wave 12 in various spectral bands, includes three elementary light sources $11_1$, $11_2$, $11_3$, taking the form of light-emitting diodes emitting in a first spectral band $\lambda_1$, a second spectral band $\lambda_2$, and a third spectral band $\lambda_3$, respectively, the spectral bands being different from one another, and, preferably, not overlapping.

Figure 5:
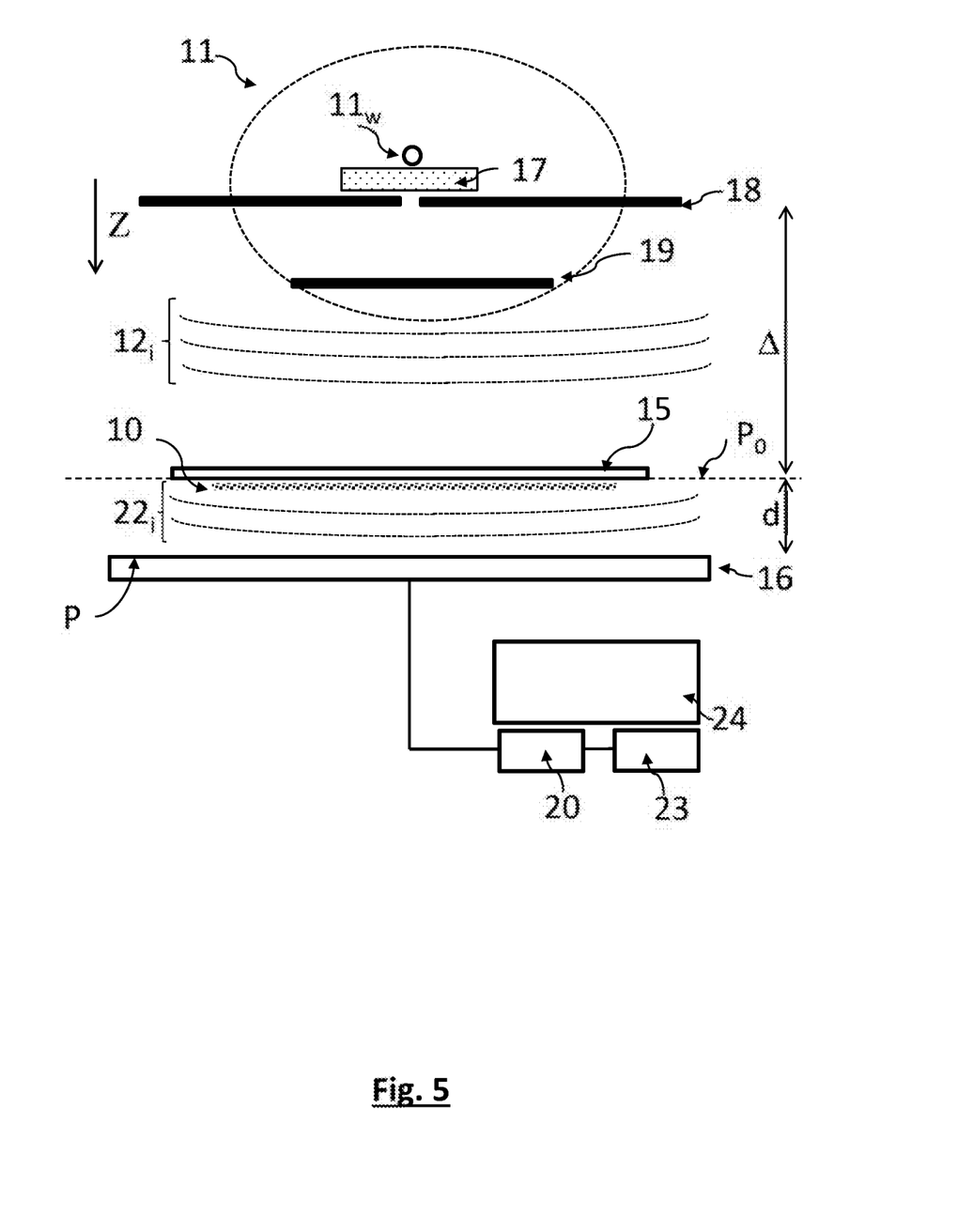
FIG. 5 shows a second example of a device for implementing the invention, the analyzed sample being an anatomopathology slide.

The light source 11 may also include a white light source $11_w$ placed upstream of a filtering device 19, for example a filter wheel, able to place a filter of pass band $\lambda_i$ between the white light source and the sample, as shown in FIG. 5, such that the image $I_i$ formed by the photodetector 16 is representative of said pass band $\lambda_i$. A plurality of filters, having pass bands that are different from one another, are then successively placed between the light source $11_w$ and the sample 10.

According to one variant, the filtering device 19 may also be a tri-band filter, defining a plurality of spectral bands. An example of a filter suitable for this application is the Edmund. Optics 458, 530 & 628 nm tri-band filter, which defines spectral bands centered on the wavelength of 458 nm, 530 nm and 628 nm, respectively. This allows the sample to be illuminated simultaneously using 3 wavelengths.

The use of a diffuser 17, such as described above, between the light source and the diaphragm 18 is preferable, whatever the embodiment.

The photodetector 16 may, as described above, be an RGB matrix-array photodetector, this allowing the various images $I_1 \ldots I_i \ldots I_N$ to be acquired in the various spectral bands $\lambda_1 \ldots \lambda_i \ldots \lambda_N$ in succession or simultaneously. In this case, the light source may be a white light source $11_w$, in which case the various images may be acquired simultaneously.

It may also be a question of a monochromatic photodetector 16, in which case the light source 11 is able to generate, in succession, a light wave in various spectral bands $\lambda_1 \ldots \lambda_i \ldots \lambda_N$. In such a configuration, the light source includes either a plurality of elementary light sources $11_1$, $11_2$, $11_3$, or a filtering device 19, as described above. In such a case, the sample is exposed in succession to incident light waves $12_1 \ldots 12_i \ldots 12_N$, N being the number of spectral bands in question. An image $I_i$ ($1 \leq i \leq N$), representative of the light wave $22_i$ transmitted by the sample is then acquired on each exposure.

Realized Trials.

Trials were carried out in the configuration shown in FIG. 1 and described above. The sample was an anatomopathology slide, including a cross section of colon stained with hematoxylin eosin saffron. The light source was placed at a distance Δ equal to 5 cm from the sample, this distance separating the diaphragm 18 from the sample 10.

Figure 6A:
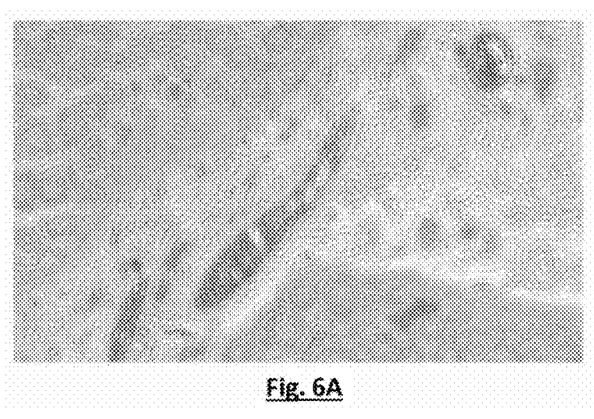
FIGS. 6A, 6B and 6C show reconstructed images, in a sample plane, in a first spectral band, reconstructed using an iterative reconstruction algorithm, these images respectively being obtained following a number of iterations respectively equal to 1, 3 and 10.
Figure 6B:
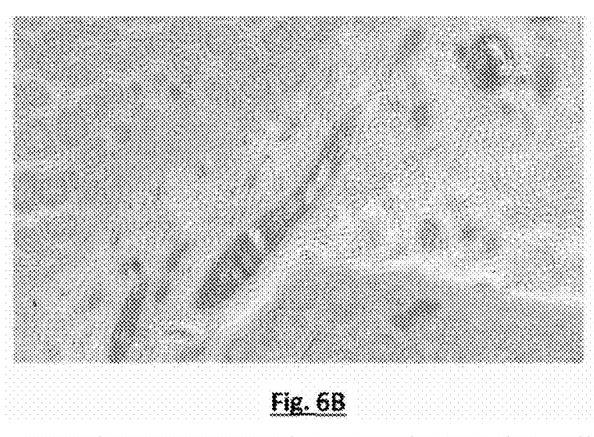
Figure 6C:
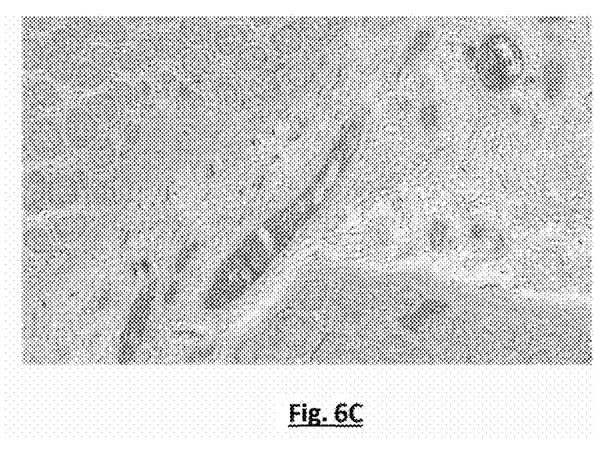

FIGS. 6A, 6B and 6C show an image of the modulus $|A_{1,p}^0(r)|$ of the complex amplitude $A_{1,p}^0(r)$ of the wave $22_1$ transmitted by the sample, in the plane $P_0$ of the sample, in the first spectral band $\lambda_1$ extending between 450 and 465 nm, these images being obtained after a number of iterations p equal to 1, 3 and 10, respectively.

Figure 7A:
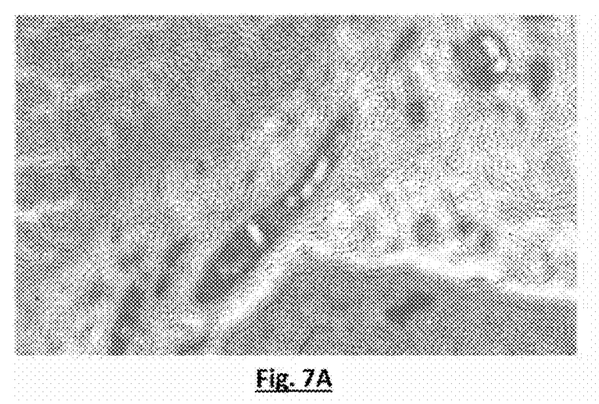
FIGS. 7A, 7B and 7C show reconstructed images, in a sample plane, in a second spectral band, reconstructed using an iterative reconstruction algorithm, these images respectively being obtained following a number of iterations respectively equal to 1, 3 and 10.
Figure 7B:
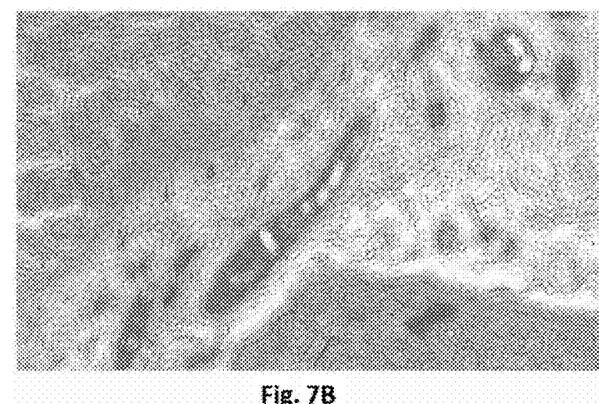
Figure 7C:
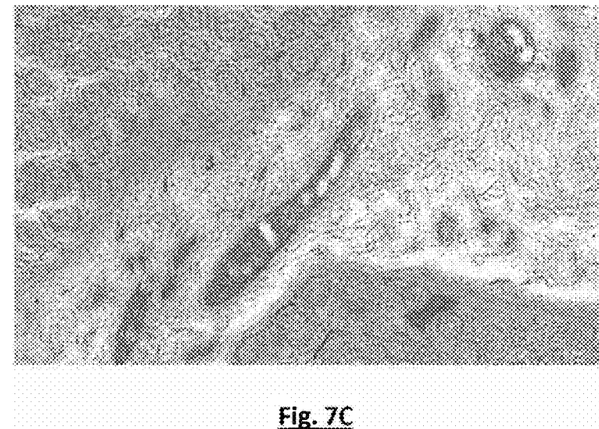

FIGS. 7A, 7B and 7C show an image of the modulus $|A_{2,p}^0(r)|$ of the complex amplitude $A_{2,p}^0(r)$ of the wave $22_2$ transmitted by the sample, in the plane $P_0$ of the sample, in the third spectral band $\lambda_2$ extending between 520 and 535 nm, these images being obtained after a number of iterations p equal to 1, 3 and 10, respectively.

Figure 8A:
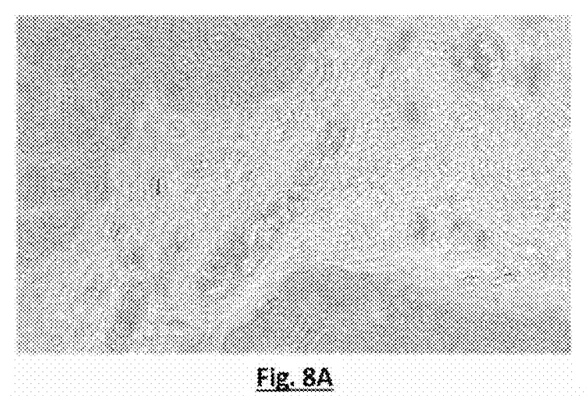
FIGS. 8A, 8B and 8C show reconstructed images, in a sample plane, in a third spectral band, reconstructed using an iterative reconstruction algorithm, these images respectively being obtained following a number of iterations equal to 1, 3 and 10.
Figure 8B:
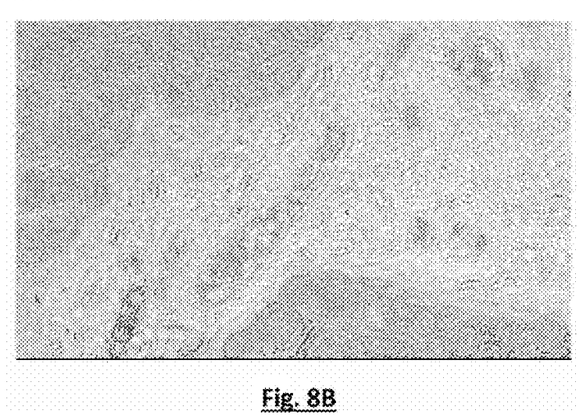
Figure 8C:
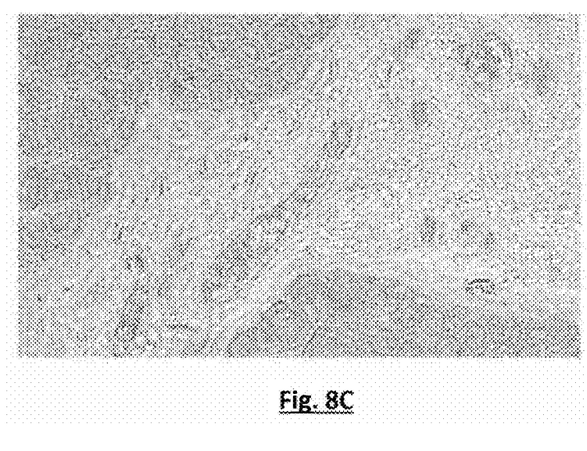

FIGS. 8A, 8B and 8C show an image of the modulus $|A_{3,p}^0(r)|$ of the complex amplitude $A_{3,p}^0(r)$ of the wave $22_3$ transmitted by the sample, in the plane $P_0$ of the sample, in the third spectral band $\lambda_3$ extending between 620 and 630 nm, these images being obtained after a number of iterations p equal to 1, 3 and 10, respectively. It will be noted that the average grayscale level of these images is higher than the grayscale level of the images of FIGS. 6A, 6B, 6C, 7A, 7B and 7C. This is due to the red-violet color of the sample.

Figure 9A:
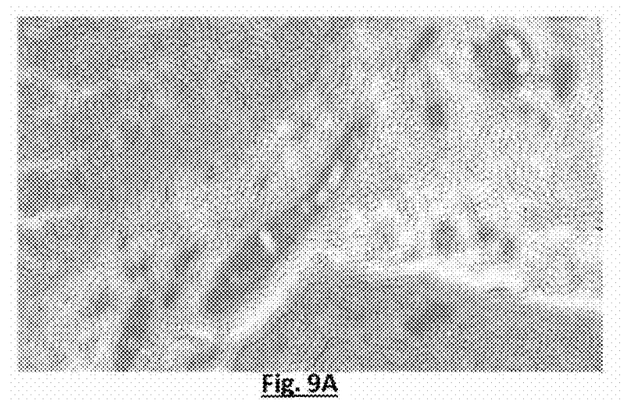
FIGS. 9A, 9B and 9C show composite images obtained by combining reconstructed images in the first, second and third spectral bands, these images respectively corresponding to 1, 3 and 10 iterations. These images are color images, here shown in black and white.
Figure 9B:
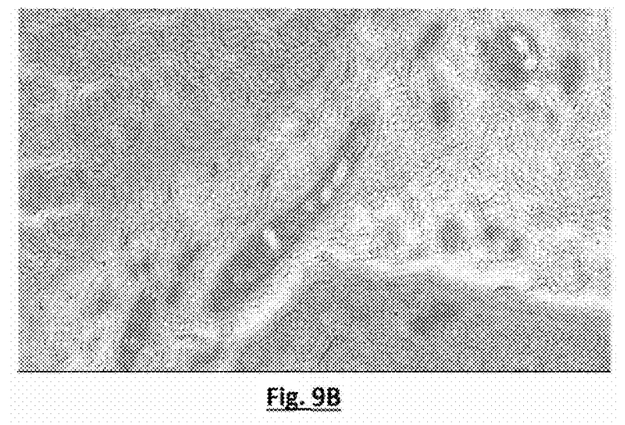
Figure 9C:
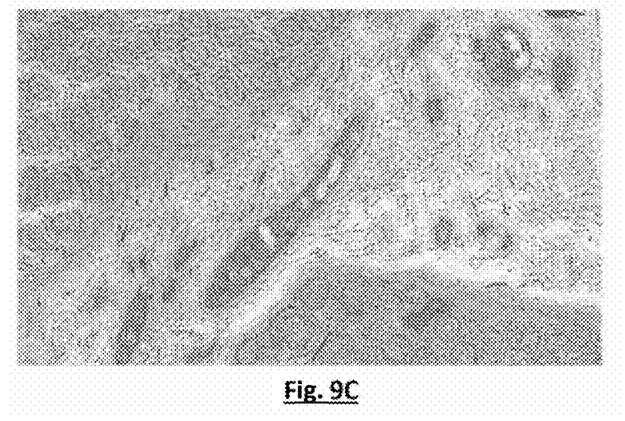

FIGS. 9A, 9B and 9C show the combination of the images 6A-7A-8A, 6B-7 B-8B, and 6C-7C-8C, respectively. These figures allow a color representation of the sample to be obtained, by simultaneously taking into account the three spectral bands $\lambda_1$, $\lambda_2$ and $\lambda_3$.

In each series of images, an increase in contrast as a function of the number of iterations may be seen. It may also be noted that images the spatial resolution of which is satisfactory are formed when the number of iterations is lower than or equal to 10, this limiting the calculation time to a few seconds.

The method is therefore suitable for the high-rate, large-field observation of samples. It allows images to be obtained in one or more spectral bands, making it compatible with the staining methods commonly used in the field(s) of anatomical pathology and/or cytopathology.

The invention claimed is:

1. A method for observing a sample, comprising:
   i) illuminating the sample using a light source that produces a light wave that propagates along a propagation axis;
   ii) acquiring, using a photodetector, a plurality of images of the sample, the images being formed in a detection plane, the sample being placed between the light source and the photodetector, each image of the plurality being representative of a light wave, transmitted by the sample under effect of the illumination, called the transmitted light wave, and each image of the plurality being acquired in a spectral band that is different from that of other images of the plurality;
   iii) determining, based on each image respectively acquired in each spectral band, an initial complex amplitude of the transmitted light wave, in said each spectral band, in the detection plane;
   iv) selecting a sample plane, in which the sample lies, and back-propagating each complex amplitude established in the detection plane, in said each spectral band, in order to determine a complex amplitude of the transmitted wave, in said each spectral band, in the sample plane;
   v) calculating in said each spectral band, based on a plurality of complex amplitudes determined in step iv), a weighted sum of the complex amplitudes, or of logarithm functions thereof, or of argument functions thereof, in the sample plane, and calculating a weighting function, the weighting function being calculated using the weighted sum;
   vi) propagating the weighting function to the detection plane so as to obtain, for at least one spectral band, a weighting function in the detection plane;
   vii) updating at least one complex amplitude of the transmitted light wave, in a spectral band, in the detection plane, using the weighting function obtained, in the spectral band, in step vi); and
   viii) repeating steps iv) to vii) until a stop criterion is reached,
   wherein, in step vii), an argument function of the complex amplitude of the transmitted light wave, in a spectral band, in the detection plane, is calculated depending on an argument function of the weighting function determined, in the detection plane and in the spectral band, in step vi).

2. The method of claim 1, wherein, in step iii), a modulus of the complex amplitude of the transmitted light wave in a spectral band is determined by normalizing the intensity of the image acquired by the photodetector, in the spectral band, by a reference intensity measured by the photodetector in the absence of sample.

3. The of claim 1, wherein, in step iv), the complex amplitude in a sample plane, in a spectral a, is determined by applying a propagation operator to the complex amplitude, defined in the same spectral band, in the detection plane.

4. The method of claim 1, wherein, in step vi), the weighting function, in the detection plane, is propagated by applying a propagation operator to the weighting function determined, in the sample plane, in step v).

5. The method of claim 1, wherein, in step vii), a modulus of the complex amplitude of the transmitted light wave, in a spectral band, in the detection plane, is calculated depending on a modulus of the initial complex amplitude, in the spectral band.

6. The method of claim 1, wherein, in stet v), the weighting function is common to all the spectral bands.

7. The method of claim 1, wherein step v) further comprises determining a plurality of weighting functions, each weighting function of said plurality of weighting functions being associated with one spectral band.

8. The method of claim 1, further comprising, following step viii):
   ix) forming an image representative of a modulus or of an argument function of the complex amplitude of the wave transmitted by the sample, in the sample plane or in the detection plane, in at least one spectral band.

9. A device for observing a sample, comprising:
   a light source configured to illuminate the sample;
   a photodetector,
   the sample being disposed between the light source and the photodetector,
   the photodetector being configured to form a plurality of images, in a detection plane, of the light wave transmitted by the sample under effect of illumination by the light source, each image being obtained in a spectral band that is different from that of other images of the plurality; and
   a processor, configured to process the plurality of images by executing instructions, programmed into a memory, which, when executed, implement the method of claim 1.

* * * * *